(12) United States Patent
Warmenhoven et al.

(10) Patent No.: US 11,184,368 B2
(45) Date of Patent: Nov. 23, 2021

(54) SYSTEMS AND METHODS FOR REPORTING COMPUTER SECURITY INCIDENTS

(71) Applicant: Bitdefender IPR Management Ltd., Nicosia (CY)

(72) Inventors: Adrianus Warmenhoven, Zwolle (NL); Richard J. Hofstede, Diepenveen (NL)

(73) Assignee: Bitdefender IPR Management Ltd., Nicosia (CY)

( * ) Notice: Subject to any disclaimer, the term of this patent is extended or adjusted under 35 U.S.C. 154(b) by 155 days.

(21) Appl. No.: 16/515,349

(22) Filed: Jul. 18, 2019

(65) Prior Publication Data

US 2020/0028857 A1 Jan. 23, 2020

Related U.S. Application Data

(60) Provisional application No. 62/699,817, filed on Jul. 18, 2018, provisional application No. 62/816,389, filed on Mar. 11, 2019.

(51) Int. Cl.
*H04L 29/06* (2006.01)
*G06F 21/56* (2013.01)
(Continued)

(52) U.S. Cl.
CPC ........ *H04L 63/1408* (2013.01); *G06F 21/567* (2013.01); *H04L 41/06* (2013.01);
(Continued)

(58) Field of Classification Search
CPC ..... H04L 63/1408; H04L 41/06; H04L 51/30; H04L 63/145; H04L 63/1425;
(Continued)

(56) References Cited

U.S. PATENT DOCUMENTS 7,164,698 B1 1/2007 Krishnamurthi et al.
8,125,920 B2 2/2012 Aitken et al.
(Continued)

FOREIGN PATENT DOCUMENTS

WO 2018122640 A1 7/2018

OTHER PUBLICATIONS

European Patent Office, International Search Report and Written Opinion dated Mar. 19, 2018 for PCT International Application No. PCT/IB2017/057197, international filing date Nov. 17, 2017, priority date Dec. 30, 2016.
(Continued)

*Primary Examiner* — Gil H. Lee
*Assistant Examiner* — Chhian (Amy) Ling
(74) *Attorney, Agent, or Firm* — Law Office of Andrei D Popovici, PC

(57) ABSTRACT

Alert manager software dynamically assembles a security alert as various security scenarios are tested to reach a verdict. Each executed scenario may contribute a scenario-specific message, so the resulting compound security alert indicates an actual line of reasoning used in reaching the respective verdict. The described systems and methods apply, inter alia, to the analysis of high-volume network flows in corporate networks. In some embodiments, flows are pre-tagged with extra metadata to facilitate detection of malware and/or intrusion.

20 Claims, 12 Drawing Sheets

(51) Int. Cl.
  *H04L 12/24* (2006.01)
  *H04L 12/58* (2006.01)
(52) U.S. Cl.
  CPC ............ *H04L 51/30* (2013.01); *H04L 63/145* (2013.01); *H04L 63/1425* (2013.01); *G06F 2221/034* (2013.01); *H04L 41/0686* (2013.01); *H04L 67/42* (2013.01)
(58) Field of Classification Search
  CPC ... H04L 41/0686; H04L 67/42; H04L 43/026; G06F 21/567; G06F 2221/034
  See application file for complete search history.

(56) References Cited

U.S. PATENT DOCUMENTS

| | | | |
|---|---|---|---|
| 8,997,227 B1* | 3/2015 | Mhatre | H04L 63/1458 726/23 |
| 2002/0027906 A1 | 3/2002 | Athreya et al. | |
| 2007/0244916 A1* | 10/2007 | Dreyer | G06F 40/186 |
| 2009/0168648 A1* | 7/2009 | Labovitz | H04L 43/00 370/229 |
| 2016/0036844 A1 | 2/2016 | Kopp et al. | |
| 2016/0173447 A1* | 6/2016 | Achim | H04L 63/1416 726/11 |
| 2017/0109441 A1* | 4/2017 | Berk | G06F 16/24575 |
| 2017/0171231 A1* | 6/2017 | Reybok, Jr. | G06F 16/23 |
| 2017/0180318 A1* | 6/2017 | Lutas | G06F 9/542 |
| 2018/0219889 A1* | 8/2018 | Oliner | G06N 3/04 |
| 2020/0259726 A1 | 8/2020 | Barsheshet et al. | |

OTHER PUBLICATIONS

Hofstede et al., "Flow Monitoring Explained: From Packet Capture to Data Analysis with NetFlow and IPFIX", IEEE Communications Surveys and Tutorials, vol. 16, No. 4, May 12, 2014.
Claise B et al., "Information Model for IP Flow Information Export (IPFIX); rfc7012.txt", Internet Engineering Task Force, IETF; Standard, Internet Society (ISOC), Geneva, Switzerland, Sep. 16, 2013, last updated Oct. 14, 2015.
USPTO, Office Action dated Aug. 25, 2020 for U.S. Appl. No. 16/475,211, filed Jul. 1, 2019.
Mylavarapu S. et al., "A model of conversation exchange dynamics for detection of epidemic-style network attacks". The 2004 47th Midwest Symposium on Circuits and Systems, vol. 3, https://doi.org/10.1109/MWSCAS.2004.1354334, Jul. 2004.
USPTO, Office Action dated Mar. 29, 2021 for U.S. Appl. No. 16/475,211, filed Jul. 1, 2019.
European Patent Office, Office Action dated Mar. 31, 2021 for EP Application No. 17 809 037.9, international filing date Nov. 17, 2017.
European Patent Office, International Search Report and Written Opinion dated Dec. 3, 2019 for PCT International Application No. PCT/IB2019/056172, International filing date Jul. 18, 2019, Priority date Jul. 18, 2018.
Mylavarapu S. et al., Abstract of "A model of conversation exchange dynamics for detection of epidemic-style network attacks", The 2004 47th Midwest Symposium on Circuits and Systems, vol. 3, https://doi.org/10.1109/MWSCAS.2004.1354334, Jul. 2004.
Intellectual Property Office of Singapore, Written Opinion dated May 26, 2020 for Application No. 11201905777V, Application filing date Nov. 17, 2017, Priority date Dec. 30, 2016.

* cited by examiner

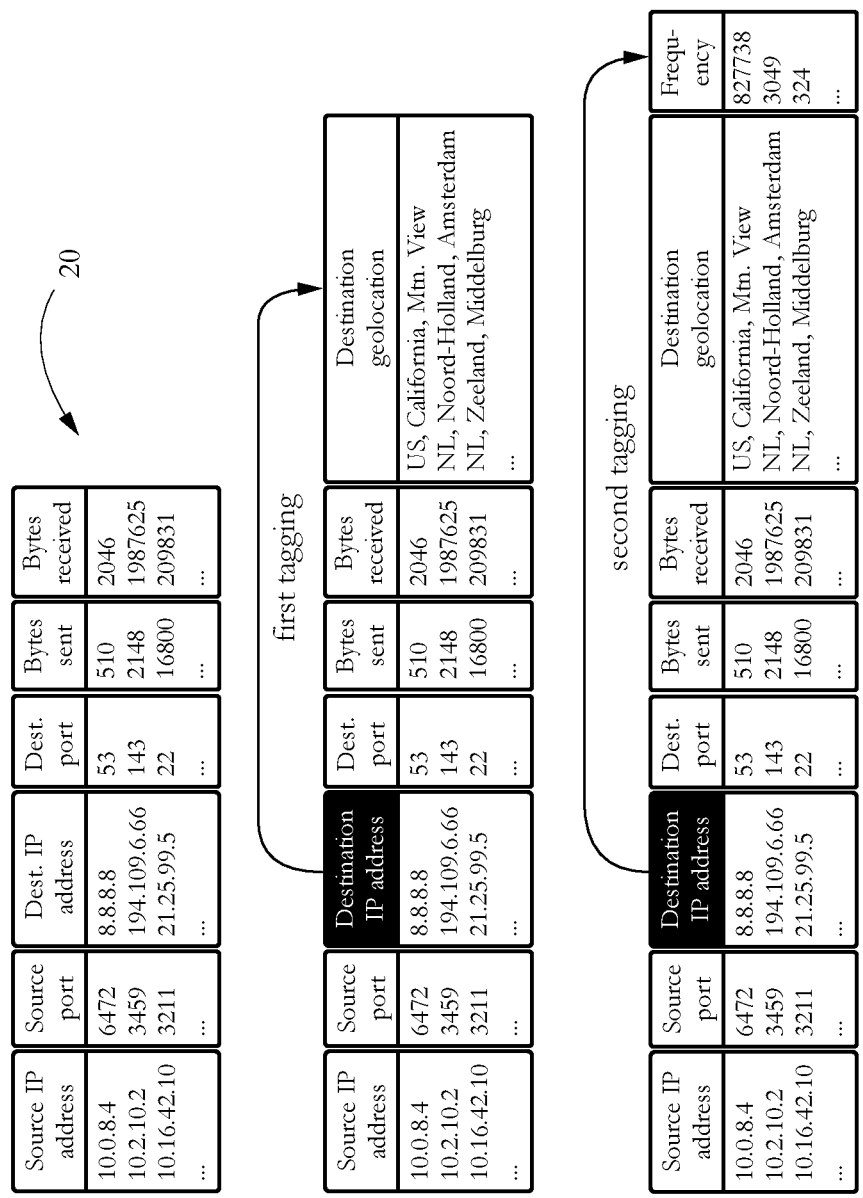
FIG. 7-A

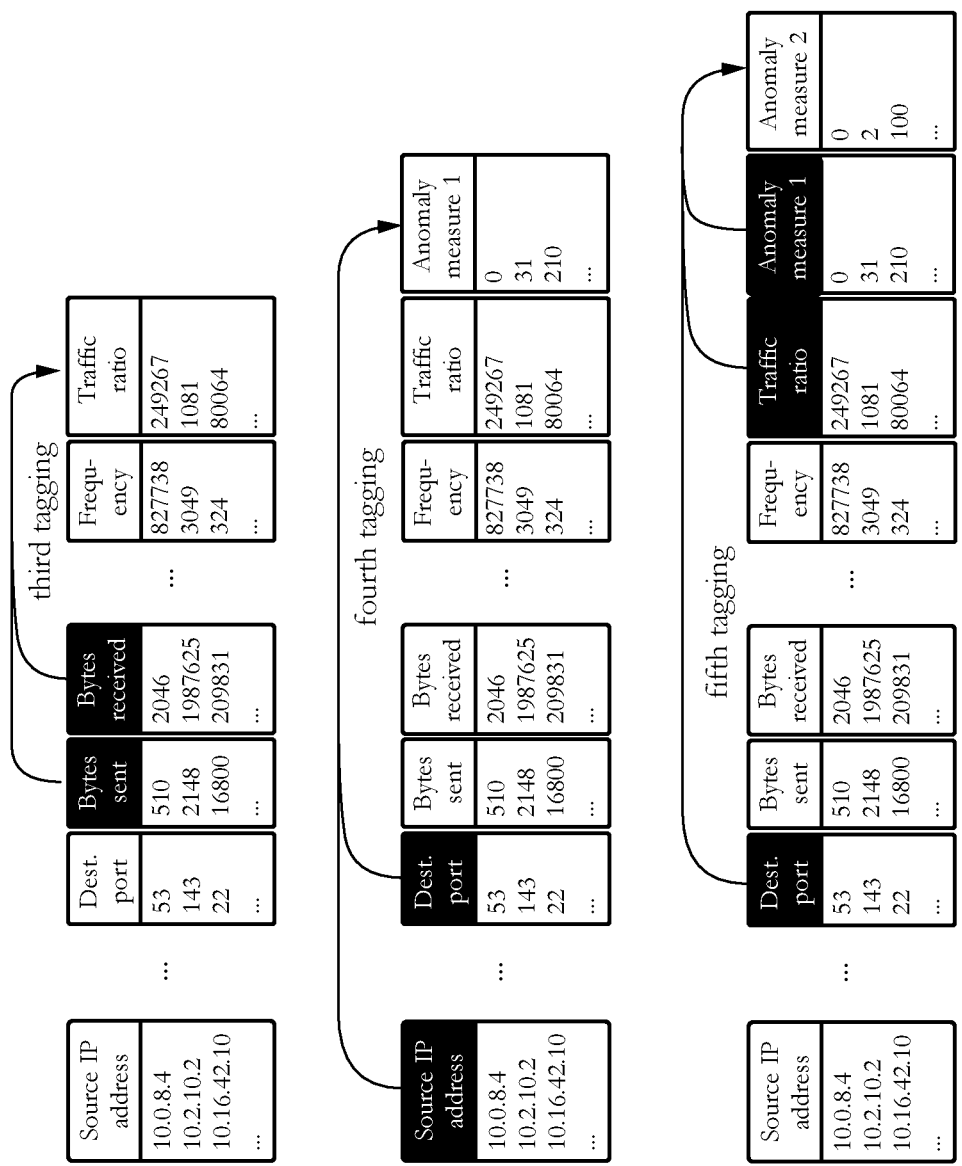
FIG. 7-B

SYSTEMS AND METHODS FOR REPORTING COMPUTER SECURITY INCIDENTS

RELATED APPLICATIONS

This application claims the benefit of the filing date of U.S. provisional patent applications No. 62/699,817, filed on Jul. 18, 2018, entitled "AI for Security Review," and No. 62/816,389, filed on Mar. 11, 2019, entitled "Systems and Methods for Reporting Computer Security Incidents," the entire contents of which are incorporated by reference herein.

BACKGROUND

The invention relates to systems and methods for mitigating computer security threats, and in particular, to reporting automatically-detected incidents to a human operator.

Malicious software, also known as malware, affects a great number of computer systems worldwide. In its many forms such as computer viruses, Trojan horses, spyware, and ransomware, malware presents a serious risk to millions of computer users, making them vulnerable to loss of data and sensitive information, to identity theft, and to loss of productivity, among others. Malicious software may also facilitate unauthorized access to a computer system, which may further allow an intruder (hacker) to extract user data and other sensitive information.

A great variety of devices informally referred to as the Internet of Things (IoT) are increasingly being connected to communication networks and the Internet. Such devices include, among others, smartphones, smartwatches, TVs and other multimedia devices, game consoles, home appliances, and various home sensors such as thermostats. As more such devices go online, they become exposed to security threats like malware and intrusion. Therefore, there is an increasing need of securing such devices against malware, as well as of protecting communications to and from such devices.

Malicious software and hacking methods are constantly evolving, challenging computer security providers to keep up with an ever-changing threat landscape. One particular category of security methods, usually known as behavioral detection, relies on monitoring the activity of a device and/or software component according to a set of rules. Some activity patterns (e.g., sequences of hardware or software events, particular features of network traffic) correspond to normal, legitimate uses of the respective device, whereas others may indicate malice.

As more and more devices are connected to the Internet and business is becoming predominantly data-driven, the speed and sheer volume of data traffic over electronic communication networks are constantly increasing and can overwhelm conventional computer security systems and methods. Furthermore, whenever human intervention is required to investigate computer security incidents, the efficiency of detection is severely limited by the ability of the security personnel to sort through large amounts of information. Therefore, there is a strong incentive for developing robust and scalable methods of analyzing and visualizing security-relevant data.

SUMMARY

According to one aspect, a method employs a server computer system to protect a plurality of client systems against computer security threats. The method comprises employing at least one hardware processor of the server computer system, in response to receiving a forensic indicator, to select a first routine for evaluating a first security predicate from a plurality of routines, the first routine selected according to the forensic indicator. The forensic indicator comprises a plurality of metadata elements characterizing a network flow between a client system of the plurality of client systems and another party. The method further comprises employing at least one hardware processor of the server computer system to select a second routine for evaluating a second security predicate from the plurality of routines, the second routine selected according to a result of executing the first routine. The method further comprises employing at least one hardware processor of the server computer system, in response to selecting the first routine, to add a first text message to a security alert indicating whether the client system is subject to a computer security threat. The first text message is determined according to a first message template selected according to the first routine. The method further comprises employing at least one hardware processor of the server computer system, in response to selecting the second routine, to add a second text message to the security alert. The second text message is determined according to a second message template selected according to the second routine. The method further comprises employing at least one hardware processor of the server computer system to transmit the security alert to an administration device configured to display the security alert to a human operator.

According to another aspect, a server computer system is configured to protect a plurality of client systems against computer security threats. The server computer system comprises at least one hardware processor configured to execute a forensic analyzer and an alert manager connected to the forensic analyzer. The forensic analyzer is configured, in response to receiving a forensic indicator, to select a first routine for evaluating a first security predicate from a plurality of routines, the first routine selected according to the forensic indicator. The forensic indicator comprises a plurality of metadata elements characterizing a network flow between a client system of the plurality of client systems and another party. The forensic analyzer is further configured to select a second routine for evaluating a second security predicate from the plurality of routines, the second routine selected according to a result of executing the first routine. The alert manager is configured, in response to the forensic analyzer selecting the first routine, to add a first text message to a security alert indicating whether the client system is subject to a computer security threat. The first text message is determined according to a first message template selected according to the first routine. The alert manager is further configured, in response to the forensic analyzer selecting the second security algorithm, to add a second text message to the security alert. The second text message is determined according to a second message template selected according to the second routine. The alert manager is further configured to transmit the security alert to an administration device configured to display the security alert to a human operator.

According to another aspect, a non-transitory computer-readable medium stores instructions which, when executed by at least one hardware processor of a server computer system configured to protect a plurality of client systems against computer security threats, causes the server computer system to execute a forensic analyzer and an alert manager connected to the forensic analyzer. The forensic analyzer is configured, in response to receiving a forensic indicator, to select a first routine for evaluating a first security predicate from a plurality of routines, the first routine selected according to the forensic indicator. The forensic indicator comprises a plurality of metadata elements characterizing a network flow between a client system of the plurality of client systems and another party. The forensic analyzer is further configured to select a second routine for evaluating a second security predicate from the plurality of routines, the second routine selected according to a result of executing the first routine. The alert manager is configured, in response to the forensic analyzer selecting the first routine, to add a first text message to a security alert indicating whether the client system is subject to a computer security threat. The first text message is determined according to a first message template selected according to the first routine. The alert manager is further configured, in response to the forensic analyzer selecting the second security algorithm, to add a second text message to the security alert. The second text message is determined according to a second message template selected according to the second routine. The alert manager is further configured to transmit the security alert to an administration device configured to display the security alert to a human operator.

BRIEF DESCRIPTION OF THE DRAWINGS

The foregoing aspects and advantages of the present invention will become better understood upon reading the following detailed description and upon reference to the drawings where:

FIG. 7-A shows an example of flow tagging according to some embodiments of the present invention.

FIG. 7-B shows another example of flow tagging according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
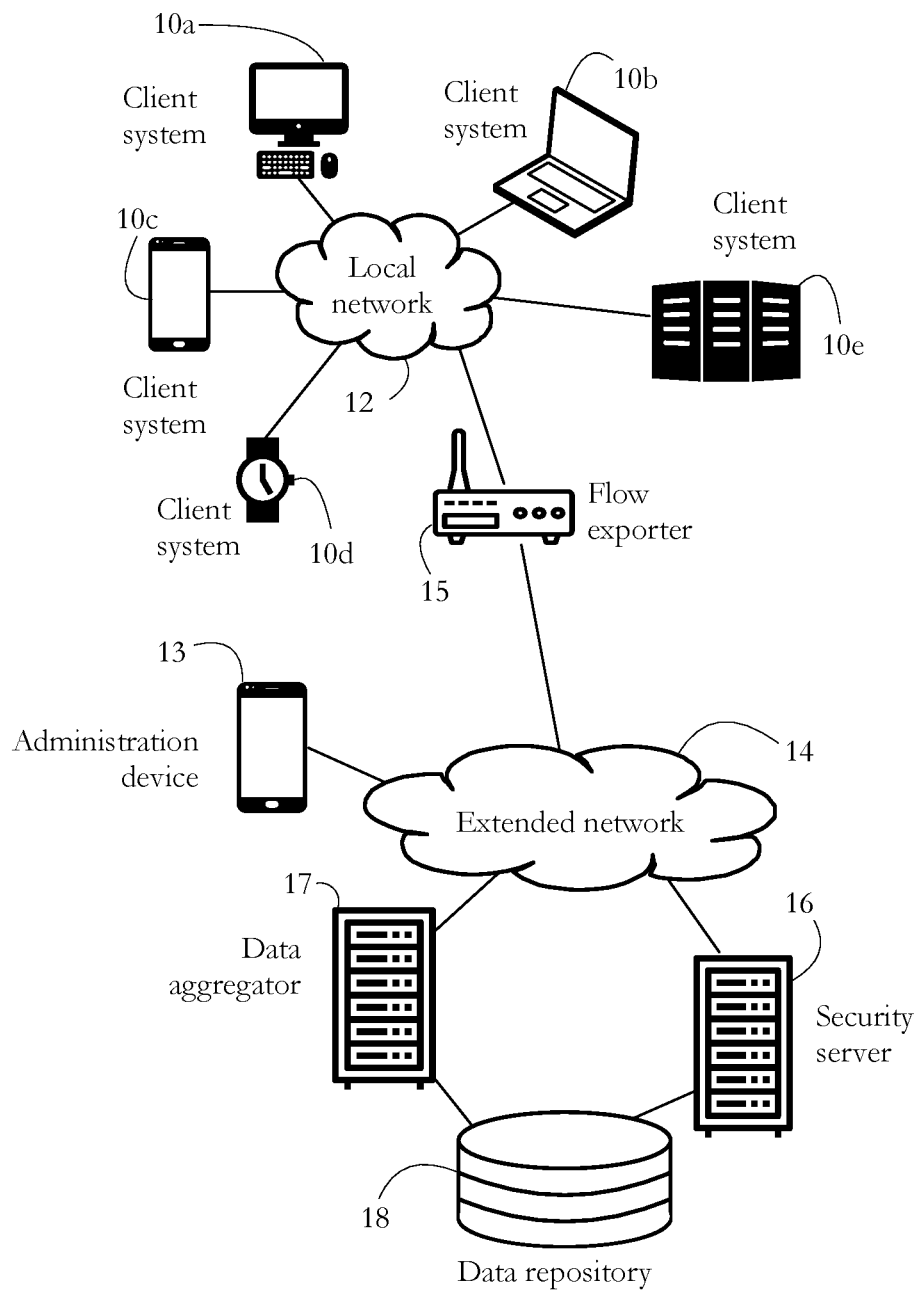
FIG. 1 shows an exemplary set of client systems protected from computer security threats according to some embodiments of the present invention.

FIG. 1 shows an exemplary configuration wherein a plurality of client systems 10a-e are protected from computer security threats according to some embodiments of the present invention. Client systems 10a-e may represent any electronic device having a processor, a memory, and a communication interface. Exemplary client systems 10a-e include corporate mainframe computers, personal computers, laptops, tablet computers, mobile telecommunication devices (e.g., smartphones), media players, TVs, game consoles, home appliances (e.g., refrigerators, thermostats, intelligent heating and/or lighting systems), and wearable devices (e.g. smartwatches, sports and fitness equipment), among others. Client systems 10a-e are interconnected by a local network 12, and further connected to an extended network 14, such as the Internet. Local network 12 may comprise a local area network (LAN). Exemplary local networks 12 may include a home network and a corporate network, among others.

In some embodiments, a flow exporter appliance 15 is configured to intercept data traffic between clients 10a-e within local network 12 and/or between clients 10a-e and other entities located outside of local network 12. In some embodiments, flow exporter 15 is configured to act as gateway between local network 12 and extended network 14, or otherwise configured so that at least a part of network traffic between local network 12 and extended network 14 traverses flow exporter 15. In some embodiments, flow exporter selectively extracts information from the intercepted traffic, represents the extracted information as a network flow encoded in an export format such as Internet Protocol Flow Information Export—IPFIX (described in an Internet Engineering Task Force Request For Comments IETF-RFC 7011) or NetFlow® from Cisco, Inc. (see e.g., IETF-RFC 3954), and exports the respective network flow data to a data aggregator or security server as shown below. A network flow may be defined as a set of data packets passing through an observation point in the network (e.g., flow exporter 15) during a certain time interval, such that all packets belonging to a particular flow have a set of common properties (e.g., same origin and/or destination). Exported information pertaining to the network flow typically comprises a metadata summary of the intercepted traffic, the respective metadata derived from the packet headers or from packet characteristics other than the actual content of the payload. Exemplary flow metadata elements include an origin and destination IP address or Internet domain name, payload size, transmission protocol, timestamp, etc. In a typical export format, data may be organized as a table, each row representing a distinct flow, and each column a value of a property of the respective flow. Such columns of a flow table are herein deemed flow elements. Flow elements formulated according to an industry standard such as IPFIX and NetFlow are herein referred to as standard flow elements.

In some embodiments, a data aggregator device 17 is configured to receive information from protected clients 10a-e and/or flow exporter(s) 15, and to organize and pre-process such information in preparation for forensic analysis. A security server 16 communicatively coupled to data aggregator 17 and/or data repository 18 is configured to analyze information harvested from clients to detect potential computer security threats.

Data aggregator 17 may carry out a partial forensic analysis on the information collected from clients and/or flow exporters. However, a typical data aggregator 17 does not make security assessments, for instance does not determine whether a particular flow indicates unauthorized access to some part of a computer system, or whether the respective flow indicates a malware infection. Instead, the type of pre-processing done by typical embodiments of data aggregator 17 is directed to accelerating and facilitating the forensic analysis done by other system components (e.g., security server 16), by taking some of the computational burden off those components. Server 16 may then focus on executing malware and/or intrusion detection routines, while a substantial part of the work required to bring data in an optimal form for security processing may be done by data aggregator 17. Exemplary pre-processing operations include event and/or flow filtering, i.e., selecting events and/or flow data according to various criteria.

Some embodiments of data aggregator 17 store security-relevant information (e.g., event indicators, network flows) in a data repository 18, which may be implemented using any type of computer-readable medium, including but not limited to a hard disk, SAN storage, RAM disk, any type of memory structures, queue and so forth. Data aggregator 17 may not store all results of flow pre-processing to data repository 18. Instead, some embodiments select some results which may be especially informative and/or may best capture some type of change in the state of a monitored client and/or network. Such results of pre-processing may be selected according to a set of pre-determined rules. The operation of data aggregator 17 will be further detailed below.

In some embodiments, client systems 10a-e are monitored, managed, and/or configured remotely using software executing on an administration device 13 connected to extended network 14 (e.g., the Internet). Exemplary administration devices 13 include a personal computer and a smartphone, among others. Device 13 may expose a graphical user interface (GUI) allowing a user (e.g., computer security professional, network administrator) to remotely monitor and/or manage operation of client systems 10a-e, for instance to set configuration options and/or to receive security alerts regarding events occurring on the respective client systems. In one exemplary use-case scenario, clients 10a-e represent individual computers on a corporate network, and administration device 13 collectively represents computers of a security operations center (SOC) configured to visualize and monitor the activity of the respective network. In one such example, administration device 13 may execute security information and event management (SIEM) software configured to display security alerts related to events occurring within the respective corporate network. In another exemplary use-case scenario, clients 10a-e represent electronic devices of a household, interconnected by a home network. In such cases, administration device 13 may represent a parent's smartphone executing an application that allows the respective parent to receive security alerts concerning clients 10a-e, to configure network access and/or parental control options, etc.

A skilled artisan will appreciate that the illustrative configuration in FIG. 1 is just one of many possible configurations. Each of components 15 and 17 may be implemented as a stand-alone network appliance or may optionally be implemented as part of a server or a group of servers, optionally as firmware or as software. For instance, flow exporter 15 and data aggregator 17 may be embodied as computer programs executing on the same physical machine. In some embodiments, data aggregator 17 may execute on security server 16. In another alternative embodiment, flow exporter 15 may represent software executing on a client system such as clients 10a-e in FIG. 1. In yet other exemplary embodiments, any of flow exporter 15 and data aggregator 17 may be embodied as a purpose-built hardware device, for instance using Field-Programmable Gate Arrays (FPGA) or Application-Specific Integrated Circuits (ASIC).

Figure 2:
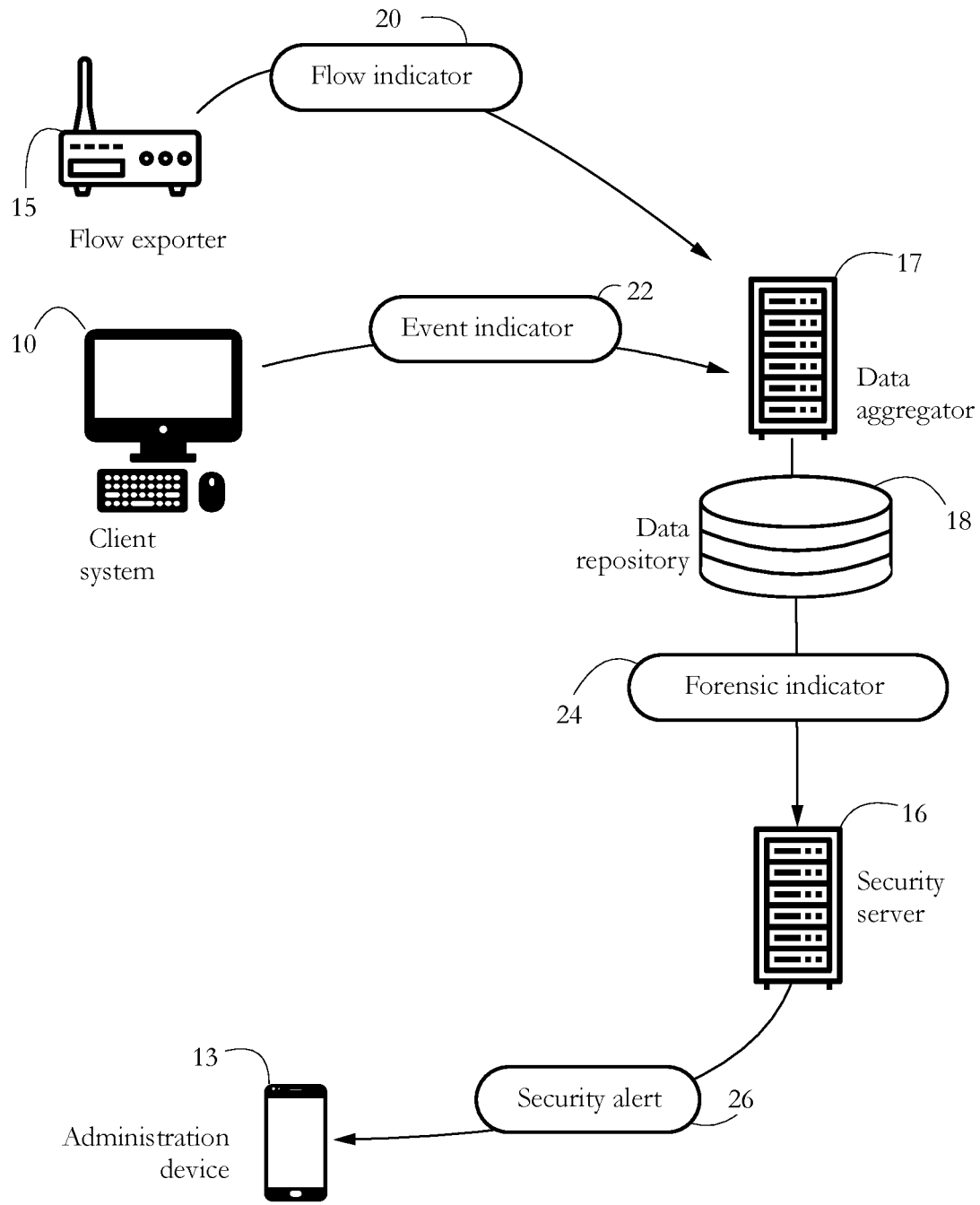
FIG. 2 shows an exemplary data exchange between various entities according to some embodiments of the present invention.

FIG. 2 shows an exemplary data exchange according to some embodiments of the present invention. Data aggregator 17 may receive an event indicator 22 from a monitored client system 10 and/or a flow indicator 20 from flow exporter 15. Event indicator 22 may comprise data indicative of the occurrence of an event during operation of the respective client system. Some such events may be indicative of a security threat. Other events may not be malice-indicative per se, but may indicate an attack when taken in the context of other events occurring on the respective client system or on other monitored client systems. An exemplary event indicator 22 may indicate that a particular malicious software (malware) was detected on the respective client system. Other examples of events communicated via event indicator 22 include a launch of a particular software component/application, an attempt to access a particular location on a local storage device (e.g., hard drive) or a particular network resource, a particular sequence of operations (e.g., a large number of disk writes occurring within a short time), etc. Flow indicator 20 may include a digest of network traffic organized as a set of metadata (e.g., NetFlow or IPFIX-formatted data table comprising a plurality of standard flow elements).

In some embodiments, data aggregator 17 may pre-process the collected data to facilitate further analysis by security server 16. Pre-processing may add detail (e.g., extra metadata) to the data received from flow exporter 15 and/or client systems 10a-e. In one such example, network flow data may be tagged with additional information (e.g., geo-location, frequency with which a particular IP address is visited, ratio between sent and received, etc.). In an alternative embodiment, such flow tagging may be performed by flow exporter 15. Details and examples of flow pre-processing/tagging are given further below.

Security server 16 generically represents a set of communicatively-coupled computer systems which may or may not be in physical proximity to each other. Server 16 is configured to analyze data harvested from clients to detect computer security threats such as malicious software and intrusion. When such analysis indicates a threat, some embodiments of server 16 transmit a security alert 26 to administration device 13. Alert 13 comprises an encoding of at least one alert message formulated in a natural language (e.g., English, Dutch, etc.), the respective message formulated to provide information to a human operator (e.g., computer security professional, network administrator, parent, etc.) about the respective threat and about the reasoning leading to the detection of the respective threat. In some embodiments, the alert message may further include values of various parameters or quantities determined during analysis (e.g. times, file sizes, network addresses, geographical locations), as well as suggestions for further action or investigation (e.g., isolate network domain X, run anti-malware software on host Y, etc.).

An exemplary alert message may read: "There is a 75% likelihood of malicious activity by an entity belonging to the 'Accounting' network sub-domain. A printer located at network address X has uploaded a substantial amount of data (size>1 Gb) to a suspect IP address (click for details). The transfer occurred outside office hours, on a weekend (click for details)." Some parts of the alert message may be hyperlinked so they reveal more text when clicked. For instance, "the target device was identified as a printer because its MAC address indicates a device manufactured by Epson", and "the target IP address was deemed suspect because it matched a greylisted item and it was geolocated to Ukraine".

Another exemplary alert message may read: "Intrusion alert! Detected by heuristics No. 5, 25, and 71 (click numbers for details)." Another version may read "Intrusion alert! Detected according to time of activity, destination address and payload size (click for details)." In the examples above, underlined items may comprise hyperlinks.

Figure 3:
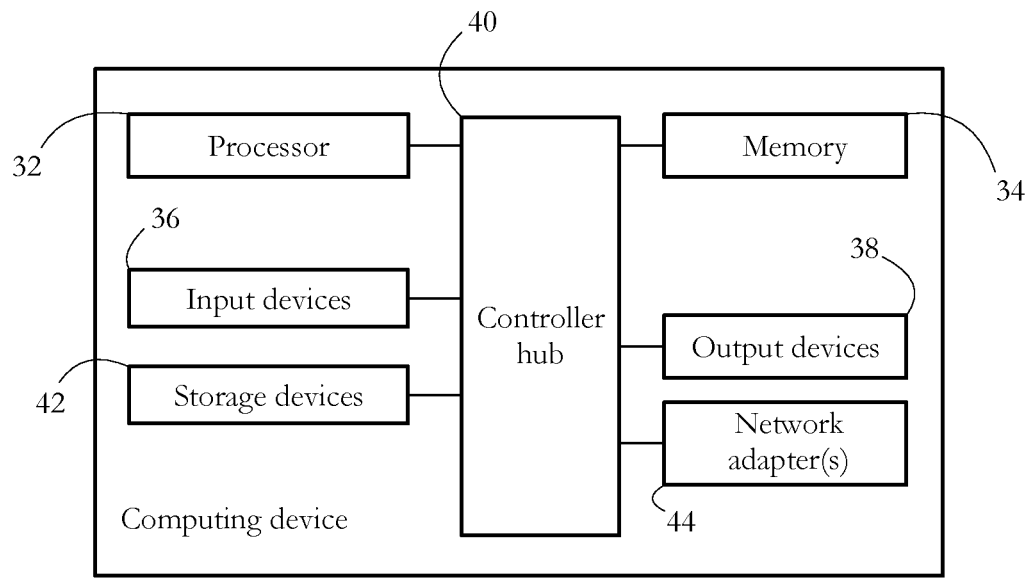
FIG. 3 illustrates an exemplary hardware configuration of a computing device according to some embodiments of the present invention.

FIG. 3 shows an exemplary hardware configuration of a computing device according to some embodiments of the present invention. The illustrated computing device generically represents any of the machines shown in FIG. 1 (clients 10a-e, administration device 13, flow exporter 15, data aggregator 17, and security server 16). The configuration shown in FIG. 3 corresponds to a computer system; the architecture of other devices such as tablet computers, smartphones, etc., may differ slightly from the exemplary architecture shown herein. Processor 32 comprises a physical device (e.g. multi-core integrated circuit formed on a semiconductor substrate) configured to execute computational and/or logical operations with a set of signals and/or data. Such operations may be encoded as processor instructions (e.g., machine code or some other programming language). Memory unit 34 may comprise volatile computer-readable media (e.g. RAM) storing processor instructions and/or data accessed or generated by processor 32 in the course of carrying out operations. Input devices 36 may include computer keyboards, mice, and microphones, among others, including the respective hardware interfaces and/or adapters enabling a user to introduce data and/or instructions into the respective computing device. Output devices 38 may include display devices such as monitors and speakers among others, as well as hardware interfaces/adapters such as graphic cards, enabling the respective computing device to communicate data to a user. In some embodiments, input devices 36 and output devices 38 may share a common piece of hardware, as in the case of touch-screen devices. Storage devices 42 include computer-readable media enabling the non-volatile storage, reading, and writing of software instructions and/or data. Exemplary storage devices 42 include magnetic and optical disks and flash (solid state) memory devices, as well as removable media such as CD and/or DVD disks and drives. Network adapters 44 enable the respective computing device to connect to a electronic communication network and/or to communicate with other devices/computer systems. Controller hub 40 represents the plurality of system, peripheral, and/or chipset buses, and/or all other circuitry enabling the communication between processor 32 and devices 34, 36, 38, 42, and 44. For instance, controller hub 40 may include a memory controller, an input/output (I/O) controller, and an interrupt controller, among others. In another example, controller hub 40 may comprise a northbridge connecting processor 32 to memory 34 and/or a southbridge connecting processor 32 to devices 36, 38, 42, and 44.

Figure 4:
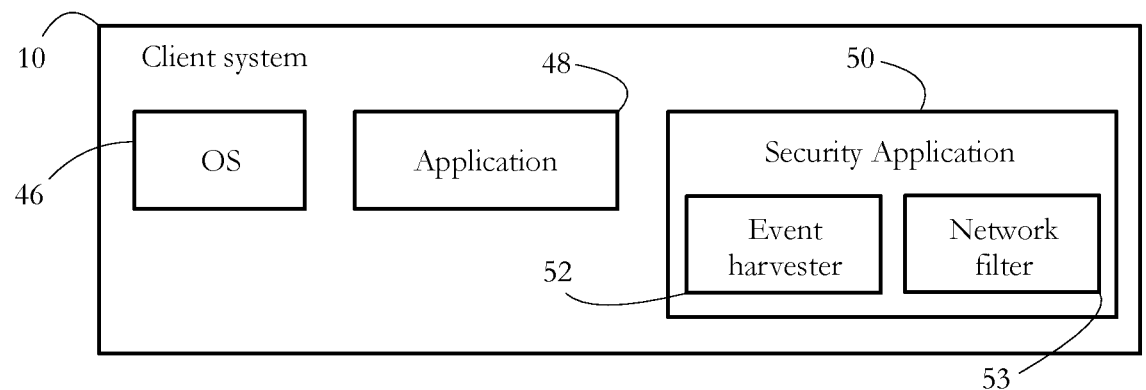
FIG. 4 illustrates exemplary software components executing on a client system according to some embodiments of the present invention.

FIG. 4 shows exemplary software components executing on a client system such as clients 10a-e in FIG. 1. Application 48 generically represents any user application, such as word processing, spreadsheet, computer graphics, browser, gaming, media player, and electronic communication applications, among others. A security application 50 may perform various computer security tasks such as detecting malicious software, application control, parental control, etc. Application 50 may comprise an event harvester 52 configured to detect the occurrence of various security-relevant events during execution of application 48 and/or OS 46. The occurrence and parameters of such events may be communicated to data aggregator 17 in the form of event indicators 22. Network filter 53 may provide communication security services, such as firewalling and/or traffic analysis. In some embodiments, network filter 53 may extract information from electronic communications between client 10 and other entities, and may export such information as a flow indicator to data aggregator 17.

Figure 5:
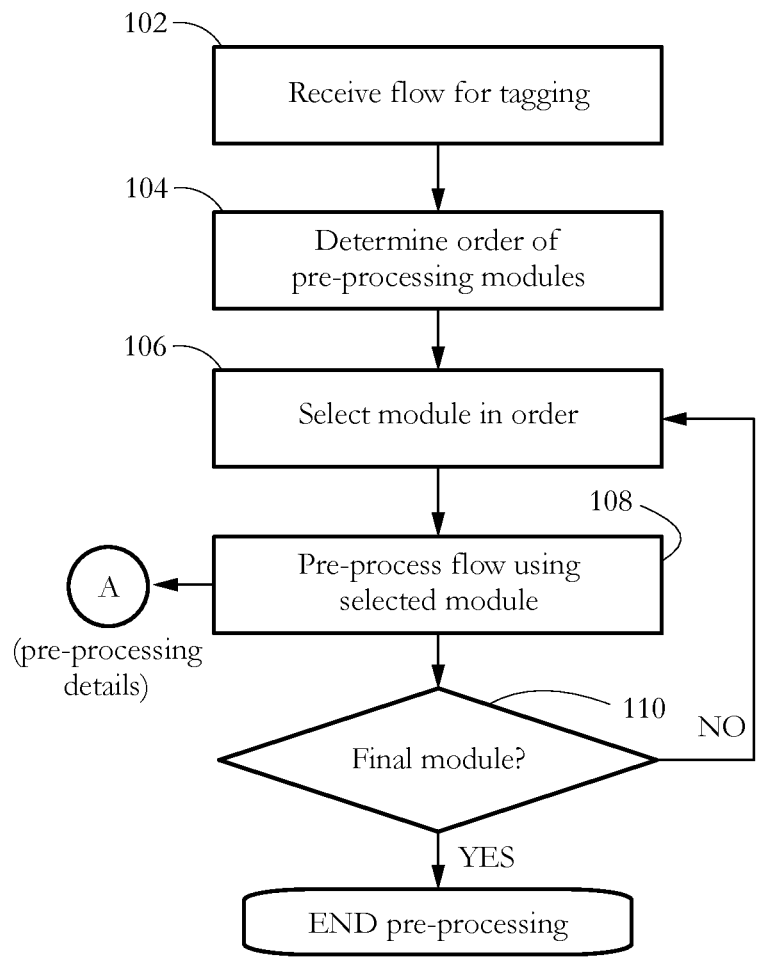
FIG. 5 shows an exemplary sequence of steps carried out as part of flow pre-processing according to some embodiments of the present invention.
Figure 6:
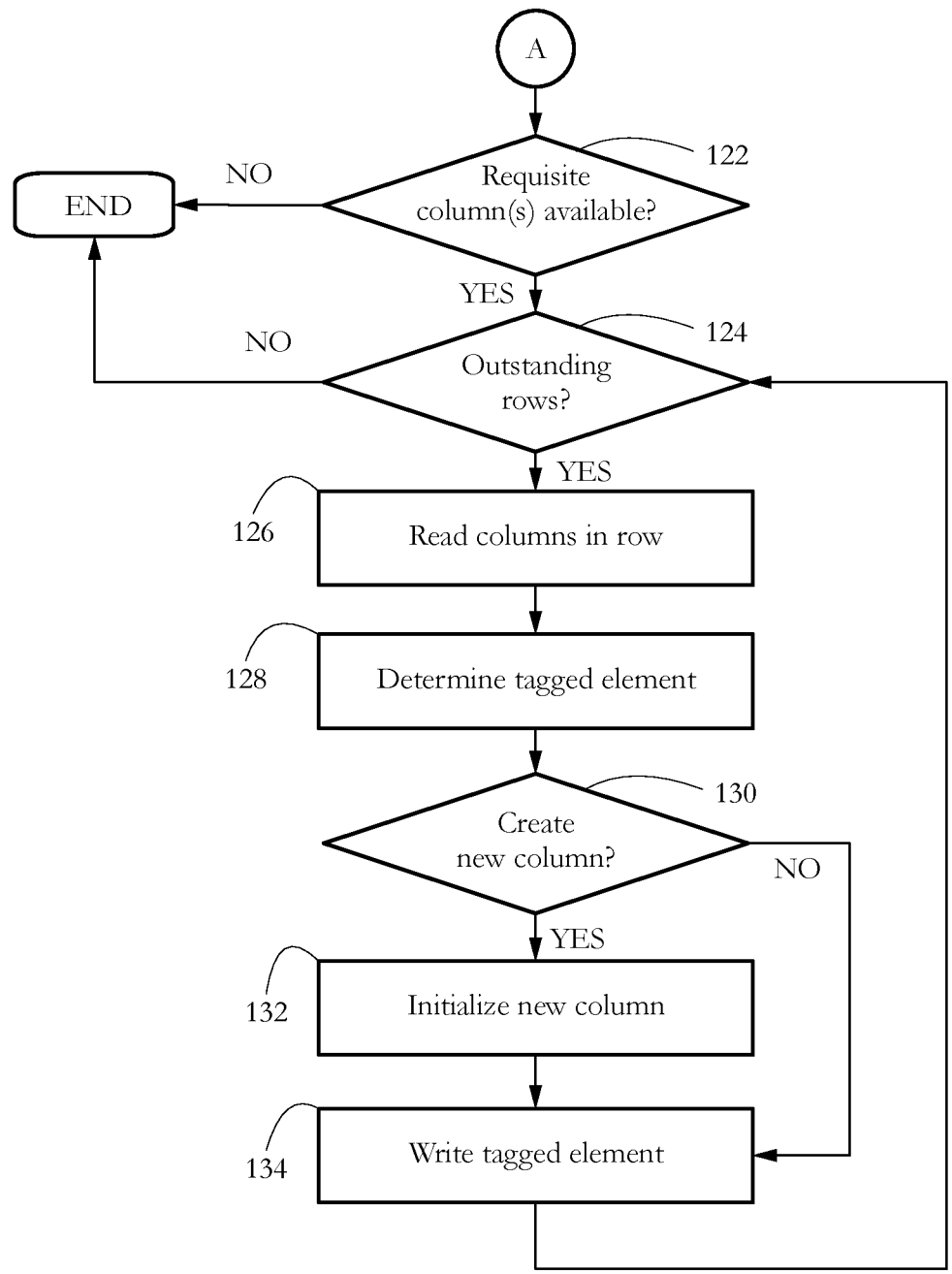
FIG. 6 shows another sequence of steps illustrating an exemplary flow tagging process according to some embodiments of the present invention.

FIGS. 5-6 show exemplary sequences of steps detailing an exemplary operation of data aggregator 17 according to some embodiments of the present invention. A particular pre-processing operation performed by aggregator 17 comprises tagging of network flows received from clients 10a-e and/or flow exporter(s) 15. Tagging herein refers to determining additional information (e.g., metadata) from incoming data such as flow indicator 20 and/or event indicator 22 (see FIG. 2), and adding the respective additional information to a representation of the respective incoming data, for instance as an additional column in a table row representing a network flow. Tagged flow elements may be determined according to any combination of standard flow elements (i.e., flow elements formulated according to a standard such as NetFlow or IPFIX), or may optionally be derived according to such standard flow elements and possibly other external and/or non-flow information.

A non-limiting example of a tagged element is a geolocation-tagged element derived from the IP address of a target network flow with the help of a geolocation look-up table. The look-up table matches the IP address to a geographical location (e.g., country, city, postal code, region, etc.), which then becomes a new tagged element of the respective flow. Another non-limiting example of a tagged element is time lapse or duration, which may optionally be calculated according to the "flow start time" and "flow end time" timestamps of a flow. Another example of a tagged element is an indicator of a frequency of requests received from a particular IP address. Still another exemplary tagged element is a traffic ratio derived from the amount of data sent to, and received from, a particular IP address or a particular port of a device located at a particular IP address. Yet another exemplary tagged element is a port/IP address element, derived according to the source IP address and the destination port of the network flow.

A particular category of tagged elements comprises compound tagged elements, which are determined according to other tagged elements and optionally according to other data. A compound tagged element may comprise a combination of a plurality of tagged elements. A non-limiting example of compound tagged element is determined according to a time lapse element and a geolocation-tagged element. Another non-limiting example is calculated by determining a volume of traffic (e.g., frequency, bytes or a combination thereof) to a particular geolocation. Compound tagged elements may in turn be used to determine other, more complex tagged elements.

FIG. 5 shows an exemplary sequence of steps carried out to perform flow tagging according to some embodiments of the present invention. In response to receiving a network flow for analysis/tagging (step 102), a step 104 may determine an order of tagging. In some embodiments, tagging is performed by a set of tagging modules, which may execute concurrently or sequentially depending on the type of data being analyzed. For instance, each tagging module may calculate a distinct tagged element. In an optimized parallel computation configuration, distinct tagging modules may execute on distinct physical processors of aggregator 17. Step 104 may determine an order in which such modules execute, for instance according to a characteristic of the analyzed network flow. In one example, execution of tagging module A requires the existence of a specific tagged element that is calculated by tagging module B. An exemplary scheduling may then ensure that module B executes before module A. Scheduling may also prevent circular dependencies and/or infinite loops. In an alternative embodiment, data aggregator 17 comprises a finite state machine which automatically triggers the execution of various tagging modules according to particularities of the analyzed network flow. For instance, each tagging module may be triggered by the availability of a particular kind of flow element.

In a step 106, a tagging module is selected according to the scheduling. A further step 108 executes the respective tagging module (for details see FIG. 6). Next, a step 110 determines whether there are still some tagging modules that need to execute, and when yes, data aggregator 17 returns to step 106 to select another tagging module for execution.

FIG. 6 shows a sequence of steps detailing execution of a typical tagging module. First, a step 122 checks whether all data necessary for deriving the respective tagged element is available, e.g., whether all the requisite flow elements have already been specified. When no, execution of the respective tagging module may end. In some embodiments, the respective module may be re-executed later when the requisite data is available.

When all required data is available, the respective tagging module(s) may execute a sequence of steps in a loop, for each row of a table representing the respective network flow, starting with a step 124 that determines whether any outstanding rows remain to be processed. For each row, a step 126 may read a set of flow elements, while a step 128 may determine the tagged element according to the respective flow elements and optionally according to other data. A step 130 determines whether a new column is to be created. When a new column must be created to receive the tagged element, the respective column is created in a step 132. A further step 134 actually writes the tagged element to the table representing the network flow. Step 134 may comprise overwriting an existing tagged element.

FIGS. 7-A-B show an exemplary incremental flow tagging process according to some embodiments of the present invention. A flow indicator 20 comprises a plurality of flows, each represented as a table row having a plurality of columns/standard elements representing, for instance, a source and a destination IP address, a packet size, etc. Flow indicator 20 may be received from flow exporter 15 (see FIG. 2 and associated description above). In the illustrated example, a first tagging module determines a geolocation according to the 'Destination IP Address' element of each flow. The newly calculated tagged element is written to a new column. A second tagging module again uses the 'Destination IP Address' element/column, but it also uses an internal database that keeps track of how often an IP address has been visited. It increments the value in the internal database, stores that value in the database and copies it to a new column herein labelled 'Frequency'. A third tagging module uses the 'Bytes sent' and 'Bytes received' columns and determines a traffic ratio, for instance as sent/received, and writes the newly calculated value to a new column herein labelled 'Traffic ratio'. A fourth tagging module uses the 'Source IP Address' and 'Destination Port' standard elements of each flow and an internal database to determine an extent to which the respective tuple of values represents an anomalous outlier from previous activity recorded at that source IP address. That new tagged element is written to a new column deemed 'Anomaly measure 1'.

In an example of compound tagging, a fifth tagging module (FIG. 7-B) uses the 'Destination Port' column and the 'Traffic ratio' column previously determined by the third tagging module to modify the value already present in the column 'Anomaly measure 1' determined by the fourth tagging module. The result is updated in the existing column 'Anomaly measure 1', or optionally in a new column herein labelled 'Anomaly measure 2'.

Figure 8:
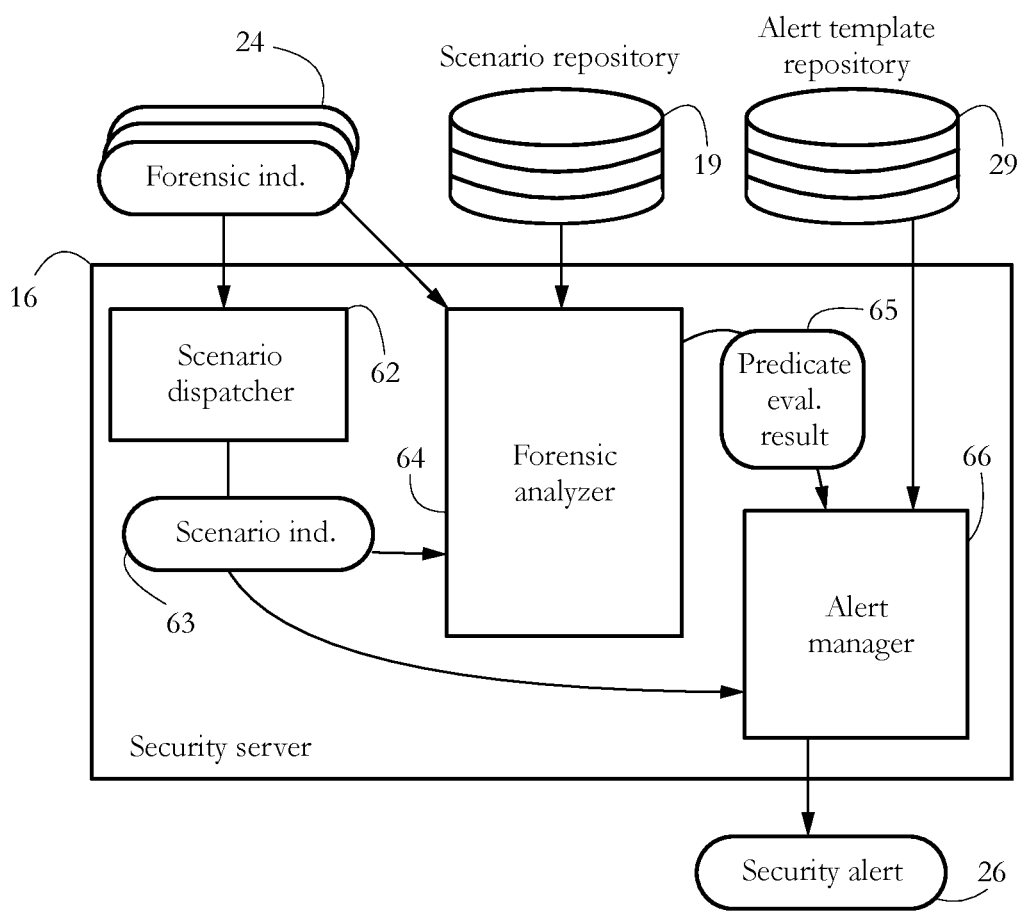
FIG. 8 illustrates exemplary software components and operation of a security server according to some embodiments of the present invention.

FIG. 8 shows exemplary components and operation of security server 16 according to some embodiments of the present invention. Components may comprise a forensic analyzer 64 connected to an alert manager 66, and a scenario dispatcher 62 connected to forensic analyzer 64 and/or alert manager 66. A skilled artisan will understand that dispatcher 62, analyzer 64 and alert manager 66 may be separate entities (e.g., separate processes, possibly executing on distinct physical processors) or distinct components (e.g., libraries) of a single software entity executing on server 16. Similarly, it should be understood that 'signaling' as described herein may represent an actual transmission of data between distinct executing entities/machines, or a passing of values between distinct modules of a single executing entity. In alternative embodiments, some components may be implemented in hardware and/or firmware.

The term predicate is used herein to denote a statement that has a variable degree of truth depending on the values of its variables. Evaluating a predicate comprises determining the truth value of the respective predicate. Exemplary predicates include "client X is under attack", "client X is a printer", and "size of uploaded data exceeds 1 Gb", among others. Some predicates are strictly Boolean (true/false), while the truth value of other predicates may be numerical, indicative of a likelihood that the respective predicate is true (e.g., there is a probability p that client X is under attack, wherein p may be 50%, 65%, 90% etc.). In some embodiments, some predicate values selectively trigger an alert, as shown in more detail below. For instance, a determination that a client X is under attack may trigger an alert, while a determination that client X is a printer may not. In another example, an alert is triggered when the likelihood that the respective predicate has the calculated truth value exceeds a pre-determined threshold (e.g., likelihood of attack>75%).

The term scenario is used herein to denote a set of rules, a protocol, or an algorithm for evaluating a predicate. One exemplary scenario comprises a set of conditions which, when satisfied by an incoming set of flow and/or event data, indicates that the respective predicate is true. A scenario may include any logical proposition comprising a set of predicates connected by AND, OR and/or NOT, for instance an implication $(p \wedge q) \vee (r \wedge s \wedge \neg t) \rightarrow u$, wherein p, q, r, s, t are premises and u is a conclusion. In one such example, u is the main predicate associated with the respective scenario (e.g., "client X is under attack"). Executing the respective scenario comprises evaluating multiple other sub-predicates p, q, . . . t. Predicate p may read "client X is a printer", predicate q may read "client X has uploaded data to a suspect IP address", while predicate t may read "activity occurred during office hours". Evaluating predicate q may in turn require evaluating several sub-predicates (e.g., checking whether the respective address is on a black- or greylist, and checking whether the respective IP address geolocates to a specific region or country). Other exemplary scenarios include a malware-detecting heuristic and a decision tree. Typically, there is a one-to-many relationship between predicates and scenarios, i.e., there may be multiple ways of evaluating a single predicate.

Some embodiments use multiple (e.g., hundreds) scenarios to detect computer security threats. Several such scenarios may execute in parallel. Scenarios may be implemented as software routines, i.e., sequences of computer instructions specific to the respective scenario. Scenarios may be stored in a scenario repository 19 in computer-readable form such as executable code, XML, bytecode, Prolog, etc. Scenarios may then be retrieved, accessed, or called selectively according to the features of the received flow and/or event indicators. To allow a selective triggering of scenarios, some embodiments of scenario repository further comprise indicators of an association between predicates and scenarios used for evaluating the respective predicates.

In some embodiments, scenario dispatcher 62 is configured to select a set of scenarios according to a predicate and/or various features of the harvested data, and to communicate the selection to forensic analyzer 64 and/or alert manager 66. Execution of some scenarios may be triggered by specific trigger events and/or trigger values of certain elements of the harvested flows. In one such example, scenario dispatcher 62 and/or forensic analyzer 64 may comprise a finite-state machine triggered by certain values of the input forensic indicators.

Forensic analyzer 64 is configured to analyze data harvested from client systems 10a-e and/or flow exporter 15 according to a set of scenarios. The analyzed data may include a result of pre-processing by data aggregator 17 and/or flow exporter(s) 15. In some embodiments, such pre-processing may include tagging, i.e., adding additional metadata to data received from clients, to facilitate analysis by forensic analyzer 64.

Figure 9:
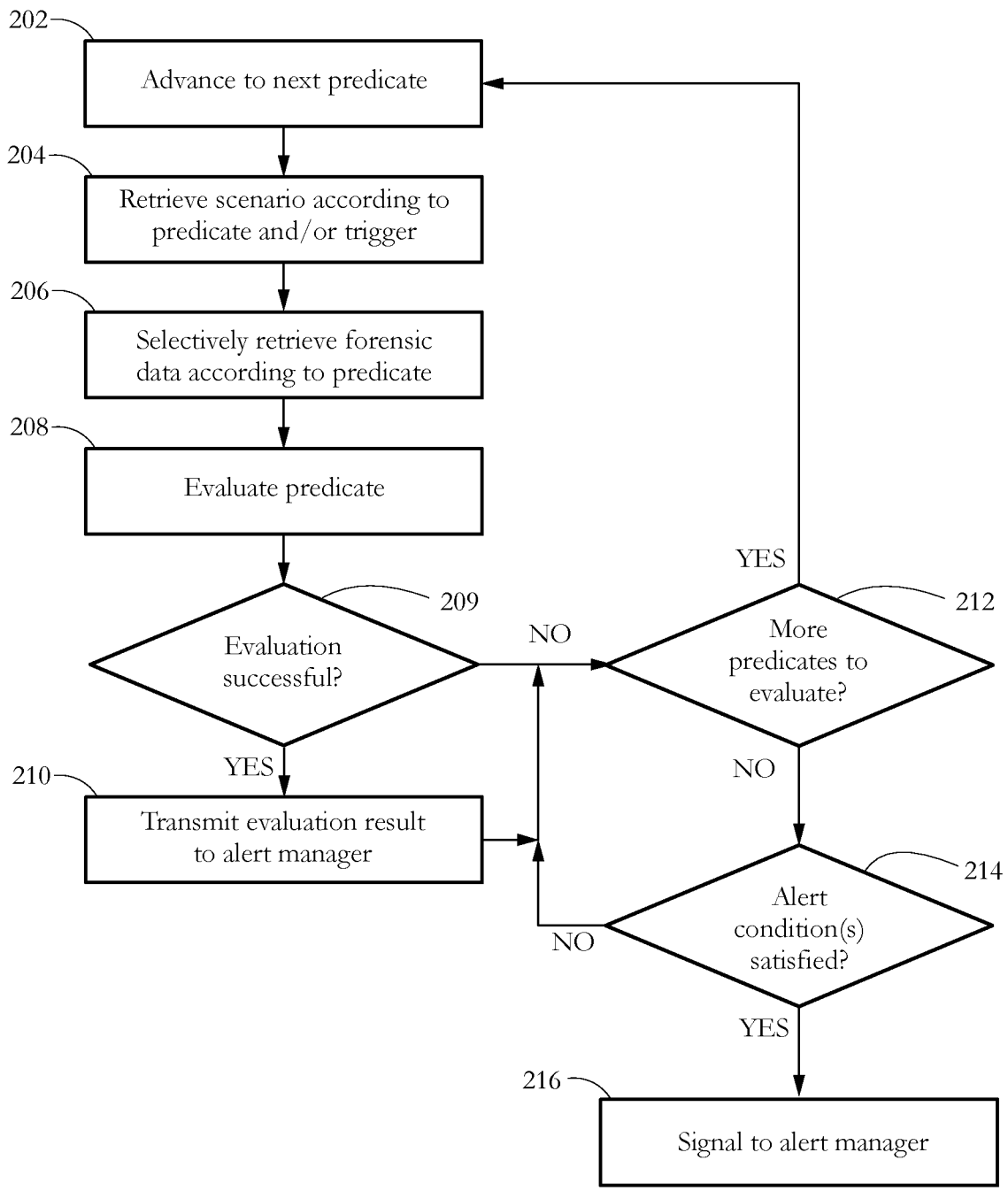
FIG. 9 shows an exemplary sequence of steps performed by a forensic analyzer component according to some embodiments of the present invention.

FIG. 9 illustrates the operation of forensic analyzer 64 according to some embodiments of the present invention. For each predicate requiring evaluation, analyzer 64 may selectively retrieve at least one scenario and execute the respective scenario to evaluate the respective predicate. Predicate evaluation may further comprise retrieving/accessing information from data repository 18. Such information may comprise device configuration settings, device identification data (e.g., a table associating MAC addresses to manufacturers or device types, etc.) and/or historical data (e.g., event or network logs, etc.). Considering that evaluation of a predicate may comprise the evaluation of other sub-predicates, wherein each such sub-predicate may be evaluated according to a distinct scenario, some embodiments execute steps 202-212 recursively, until all respective predicates and sub-predicates are evaluated.

A step 202 advances to the next predicate. A step 204 retrieves a scenario according to the predicate and/or trigger data. A step 206 selectively retrieves forensic data according to the predicate. A step 208 then evaluates the predicate. In some embodiments, a step 209 may check whether predicate evaluation was successful. Occasionally, some predicates cannot be evaluated because of lack of the requisite data. In some cases, another attempt to evaluate the respective predicate may be made at a later time. When the respective predicate was successfully evaluated, in a step 210, forensic analyzer 64 transmits a result of evaluating the current predicate to alert manager 66. In response, manager 66 may formulate a text part of an alert according to such results received from analyzer 64 (more detail below). A step 212 determines whether there are any more predicates to be evaluated. When predicate evaluation is complete, a step 214 may verify whether the calculated predicate value satisfies an alert condition (e.g., probability of attack >75%). When yes, analyzer 64 may signal alert manager 66 to prepare security alert 26 for transmission (step 216).

In some embodiments, alert manager 66 formulates and distributes security alerts 26 to administration device 13 (see FIG. 2). Alerts comprise a text part formulated in a natural language. The respective text part may incorporate various values (e.g., predicate values) evaluated during scenario execution by forensic analyzer 64. Alert manager 66 may formulate alert messages according to a set of pre-determined alert templates. In some embodiments, each alert template is associated with a scenario, allowing a selective retrieval of the respective template according to the scenario(s) executed by forensic analyzer 64. An exemplary alert template may comprise text formulated in a natural language and a set of placeholders for values of predicates evaluated as part of the respective scenario. Some exemplary templates are shown below:

T1: There is a [% val_1] probability of intrusion. Target IP address [% val_2]. Assessment based on device type, volume of uploaded data, and destination IP, as follows.

T2: Client device is a [% val_3].

T3: On [% val_4], the client has uploaded approximately [% val_5] of data to a suspect IP.

T4: Client device is a printer according to the MAC address and exposed communication interfaces.

T5: IP address was deemed suspect because it geolocated to [% val_6].

T6: IP address was matched to a blacklisted item.

wherein [% val_i] indicate placeholders for items including an IP address, a date, a file size, etc. Alert templates may be stored in a dedicated template repository 29, or alternatively may be included in scenario repository 19. In one example, alert templates may be coded together with an associated scenario, for instance as a part of an XML, bytecode, or Prolog encoding of the respective scenario.

Figure 10:
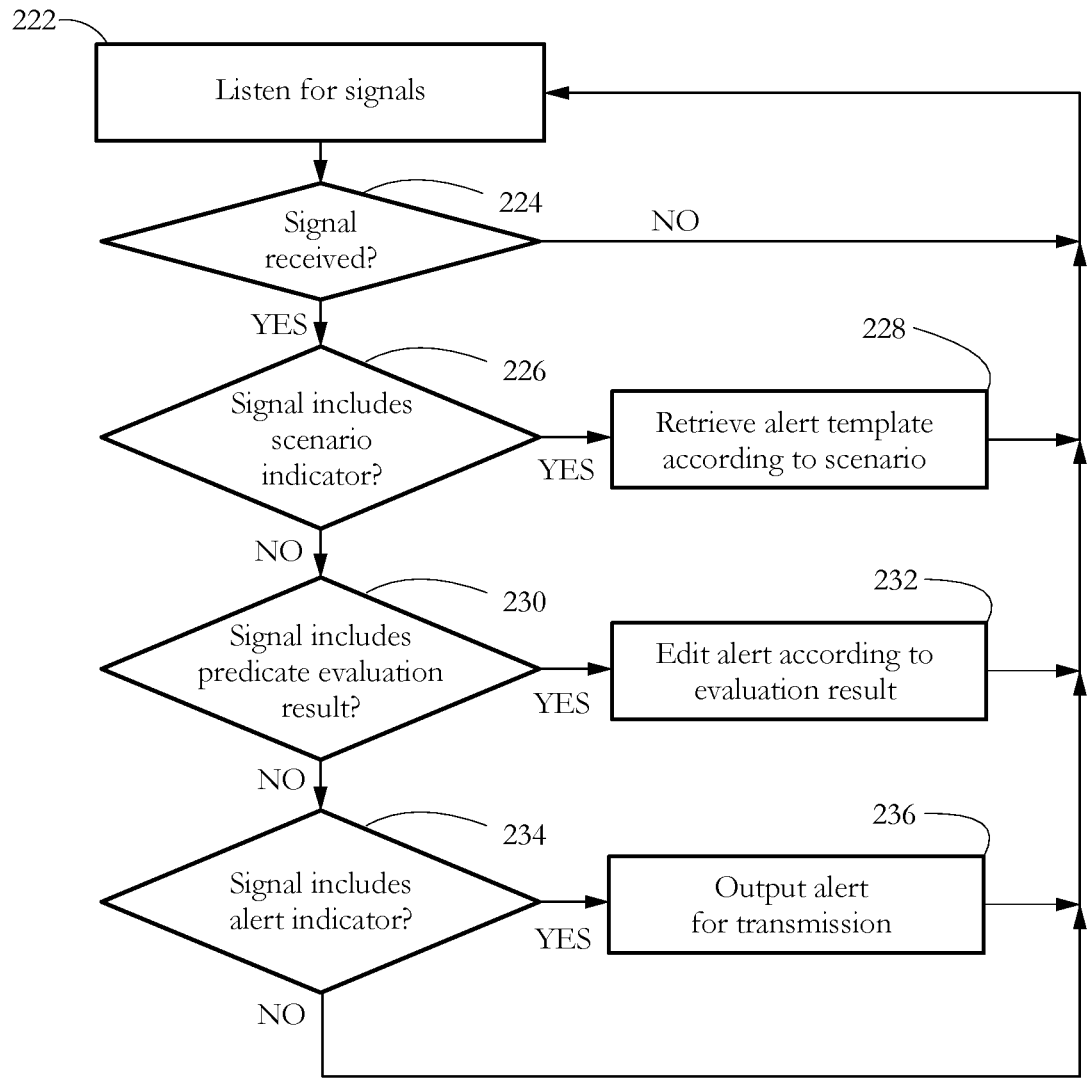
FIG. 10 shows an exemplary sequence of steps performed by an alert manager component according to some embodiments of the present invention.

FIG. 10 shows an exemplary sequence of steps performed by alert manager 66 according to some embodiments of the present invention. The illustrated alert manager listens for signals received from scenario dispatcher 62 and/or forensic analyzer 64 (step 222). An alert message is then progressively constructed based on individual scenario-specific templates and evaluation results received from forensic analyzer 64. A step 224 checks whether a signal has been received. A step 226 determines whether the received signal includes a scenario indicator. When the received signal comprises a scenario indicator 63 (FIG. 8), alert manager 66 may selectively retrieve an alert template associated with the respective scenario from template repository 29 (step 228). A step 230 determines whether the received signal includes a predicate evaluation result. As various scenario predicates are evaluated, a step 232 may edit the current alert message to include calculated values. In some embodiments, step 232 may simply instantiate the respective template with the evaluated predicate values (in the above examples, replacing a placeholder [% val_3] with "printer" and a placeholder [% val_4] with a timestamp).

When evaluating a predicate comprises evaluating a set of sub-predicates, alert manager 64 may recursively retrieve templates according to scenarios for evaluating the respective sub-predicates. In such situations, step 232 may comprise reformulating the current alert message according to the alert template of the main scenario/predicate and further according to individual template(s) associated with the respective sub-predicate(s). In some embodiments, such re-formulating may simply comprise concatenating the main alert template with the templates of the respective sub-predicates. Using the exemplary templates illustrated above, concatenation may result in an alert template reading "T1T2T3". In alternative embodiments, concatenation may be replaced with more sophisticated processing, for instance to produce a hierarchical template allowing a user to access various levels of information related to the respective security situation. Such exemplary re-formulating of templates includes introduction of hyperlinks, diagrams, itemized lists, etc.

When alert manager 234 receives an alert indicator from analyzer 64, indicating the fulfillment of a set of conditions for alerting the user/administrator, alert manager 66 may assemble security alert 26 including the text message constructed in steps 226-232, and output alert 26 for transmission to administration device 13 (step 236).

The exemplary systems and methods described above allow an efficient detection and communication of computer security threats even in high performance computing applications and high-speed networks. Some embodiments use distributed agents to harvest security-relevant data from clients. Such data may include, for instance, network traffic digests and/or information about the occurrence of specific events during execution of software on a protected client device. The harvested information is then centralized and pre-processed before being fed to a forensic analyzer configured to determine whether the harvested data is indicative of a computer security threat, such as malicious software and/or network intrusion. Pre-processing may include, for instance, tagging network flow data with additional security-indicative information (e.g., metadata derived according to various aspects of the respective flow and/or according to non-flow data). Such pre-processing may substantially facilitate detection by relieving the forensic analyzer of some of the computational burden associated with detection. Such distribution of computational costs among components of the security system may be especially important in high-speed, high-performance computing applications where the volume of data may overwhelm more conventional, centralized computer security systems.

Some embodiments of the present invention rely on the observation that the speed and sheer volume of data circulating over modern electronic communication networks may easily overwhelm computer security personnel. Therefore, there is a strong incentive for developing robust and scalable methods of analyzing and visualizing security-relevant information. Some embodiments enable an intuitive presentation of the relevant details in response to the detection of a security event, so that even an average-skilled computer operator could understand what happened and how to respond to each situation.

Some embodiments display an alert message formulated in a natural language (e.g., English, Chinese) detailing various aspects of a security event, including an account of a reasoning that led to its detection. Such alert messages substantially facilitate understanding of a security event, allow a human operator to mentally verify the accuracy of the verdict provided by the machine, and further allow reporting of the respective event to non-technical personnel (e.g., managers, parents, etc.). Some such messages may even be used as forensic evidence in a court of law.

Some embodiments construct the alert message progressively and dynamically by assembling message fragments as the machine traverses the detection algorithm. In one such example, a message fragment may be added every time a condition is evaluated or a specific variable is calculated. The alert message may thus evolve from "X happened" to "X happened because Y" to "X happened because Y and Z, wherein Z was determined based on $Z_1$ and $Z_2$", etc.

One advantage of such a dynamic message construction is that it does not require a-priori knowledge of all detection scenarios, possible outcomes, and possible combinations of parameters. Instead of tailoring alert messages to each security situation (e.g., to each outcome of the forensic analysis), some embodiments attach an alert message template to each detection scenario and/or to each routine for evaluating a security-relevant quantity (e.g., determining a device type, determining a reputation of a communication partner, etc.). The full alert message may then be constructed dynamically from message fragments generated by individual templates selected according to how the respective event was actually detected. Taking the example of a decision tree wherein each 'leaf' corresponds to a unique combination of conditions, instead of attaching pre-determined alert messages to individual leaves, some embodiments attach message fragments to intermediate branches and sub-branches of the decision tree. Then, the actual alert message is constructed according to the particular manner of traversing the decision tree.

Figure 11:
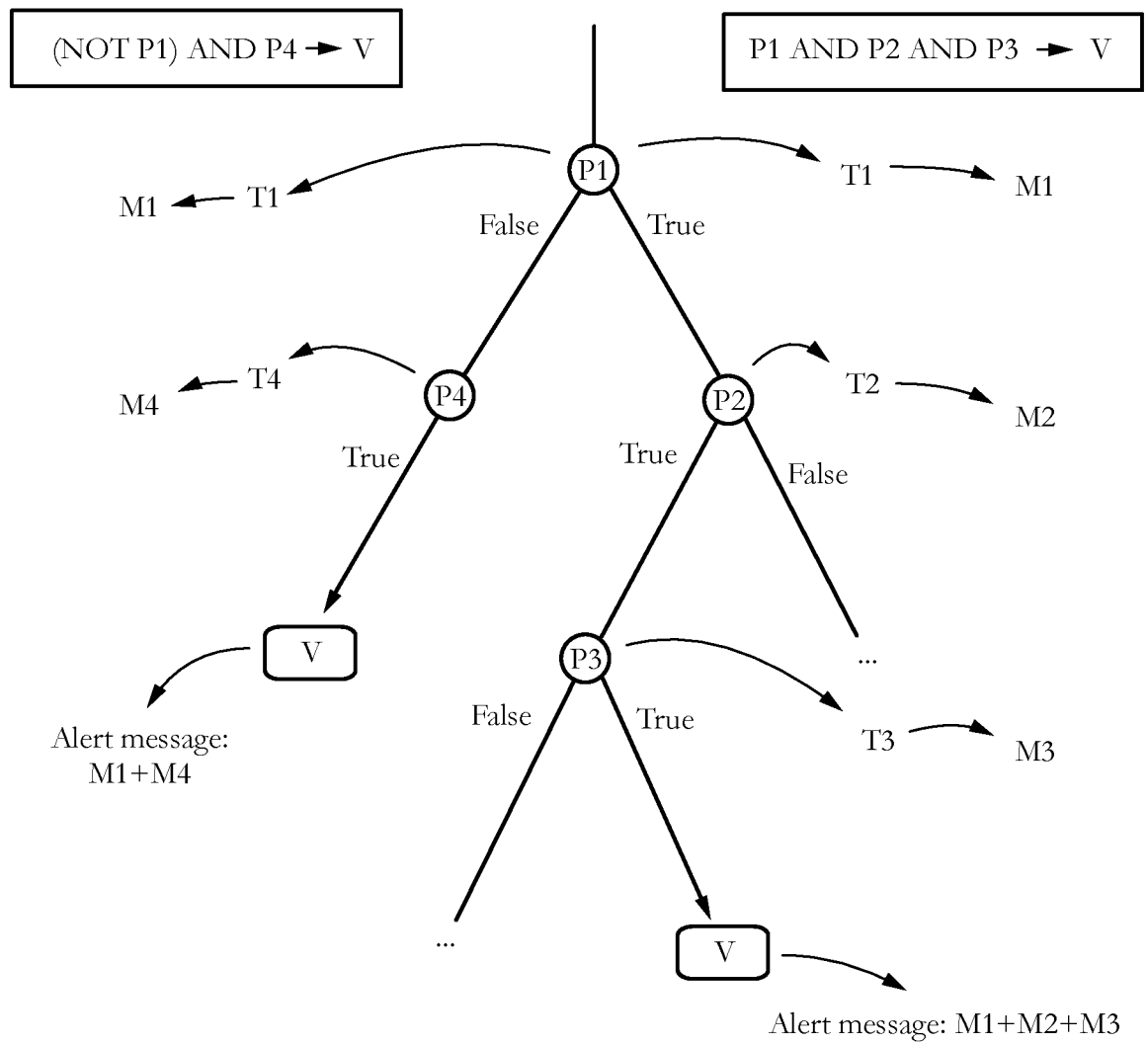
FIG. 11 illustrates an exemplary attack detection procedure comprising a decision tree, according to some embodiments of the present invention.

One such example is illustrated in FIG. 11. A detection routine comprises a decision tree, wherein nodes represent various predicates, and branches represent distinct values of the corresponding predicates. For instance, predicate P1 may read "client is a printer," predicate P2 may read "client has uploaded a large file," etc. In the illustrated example, two distinct paths through the decision tree arrive at the same verdict V, e.g., "client is under attack." However, in some embodiments the alert message generated by walking one detection path will differ from the alert message generated by the other detection path. In the illustrated example, alert templates T1, . . . , T4 are associated with predicates P1, . . . , P4, respectively. Each such template may produce a message fragment M1, . . . , M4, respectively. In an exemplary embodiment where message fragments are concatenated to form the full alert message, the left-hand path produces alert message M1+M4, wherein the right-hand path produces alert message M1+M2+M3, even though the verdict is the same. In contrast, a system wherein a predetermined alert message is associated with the verdict V produces the same alert message for both left-hand and right-hand detection paths.

When security-relevant data is generated and processed at high speed, possibly in parallel computing configurations, situations may occur wherein some information which is required for evaluating a particular predicate is not available at the moment a particular scenario is called upon. However, the respective information may be available at a later time. So even when the data harvested from client machines and networks triggers the same detection scenario(s), some of these scenarios may not actually be executed every time, so the security analysis actually carried out may differ from one time to another. Stated otherwise, in fast moving asynchronous computation configurations as required sometimes to process the sheer volume of information generated by modern computers and networks, the line or reasoning/exact sequence of predicate evaluations is not a-priori known. A dynamically-generated alert system as in some embodiments of the present invention may allow an operator to understand exactly which line of reasoning was used each time, and why two similar situations may sometimes produce conflicting security verdicts.

Furthermore, in the ever-changing world of computer security, there may be multiple ways of detecting a security threat, and multiple ways of computing various security parameters. New analysis tools, algorithms, and attack scenarios are constantly being developed. With recent advances in artificial intelligence, there is an increasing interest in letting the machine flexibly choose from an available set of tools. The dynamic generation of alert messages provided by some embodiments of the present invention is capable of accommodating such flexible decision making.

Figure 12:
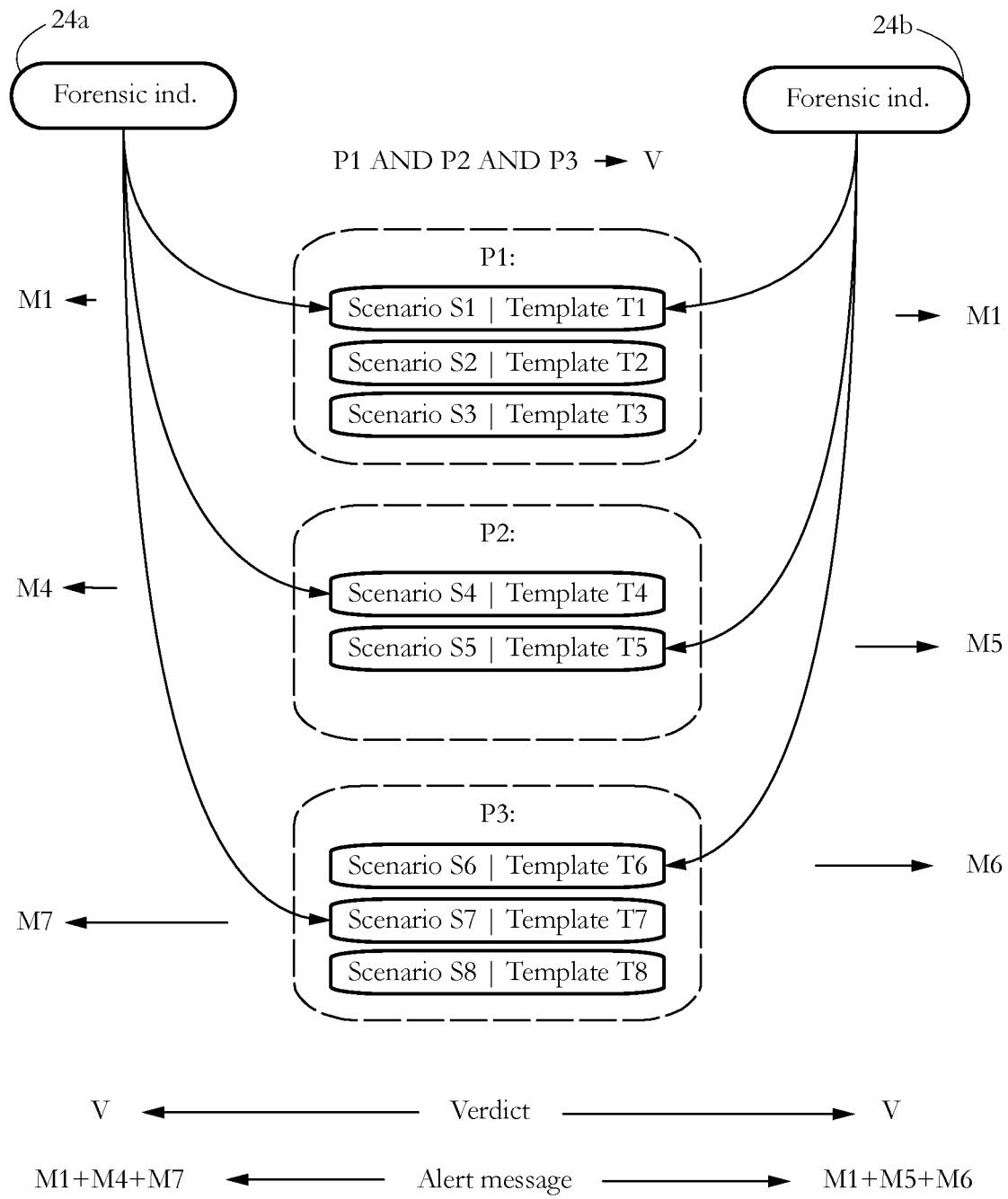
FIG. 12 shows another exemplary attack detection procedure according to some embodiments, the procedure comprising multiple steps, wherein each step may be carried out according to multiple scenarios.

In one such example illustrated in FIG. 12, a detection routine comprises evaluating three distinct predicates P1, P2, and P3. However, each predicate may be evaluated in multiple independent ways illustrated by the distinct scenarios S1, . . . , S8. Examples of such scenarios include distinct analysis heuristics, for instance analyzing distinct aspects of the input data. Two distinct data sets (forensic indicators 24*a*-*b*) may trigger distinct scenarios for evaluating the relevant predicates. For instance, forensic indicator 24*a* may trigger scenarios S1, S4, and S7, while indicator 24*b* may trigger scenarios S1, S5, and S6. In the illustrated embodiment, each scenario comprises an associated alert template. The respective templates generate a set of message fragments M1, M4, M7, and M1, M5, M6, respectively, which are assembled by alert manager 66 into the illustrated alert messages. The example shows that alert messages may differ even though the verdict is the same in both cases. Distinct alert messages (M1+M4+M7 vs. M1+M5+M6) indicate the distinct manners in which the verdict was reached. In situations wherein the left and right sequences of scenarios yield conflicting verdicts, the alert messages may offer a substantial insight to the analyst as to the reasons for such a discrepancy.

Another exemplary embodiment which may be illustrated using FIG. 12 may try all alternative manners of evaluating each predicate. For instance, forensic analyzer 64 may evaluate predicate P1 using all three scenarios S1, S2, and S3, and predicate P2 using both scenarios S4 and S5. Scenarios may execute in parallel, e.g., on distinct processors or machines. Each scenario may have an intrinsic reliability reflected, for instance, in performance measures such as a detection rate and/or a rate of false positives. Such a system may therefore generate a plurality of verdicts, each verdict corresponding to a distinct combination of scenarios, each combination having its own degree of trustworthiness which may be spelled out in the respective alert message. Compound alert messages that indicate a specific combination of scenarios used for each verdict may thus help an analyst make sense of conflicting verdicts, and ultimately which verdict to trust.

With respect to the examples illustrated in FIGS. 11 and 12, verdict V may represent various types of predicate, for instance a main security predicate such as "client is under attack," or any sub-predicate evaluated as part of a security scenario: "client is a printer," "IP address is suspect," "anomalous network traffic at node X," "traffic at node X exceeds expected volume," etc.

An additional advantage of dynamically constructing security alerts is that it allows decoupling various components of the security system. In particular, it allows developing detection scenarios independently of each other. Stated differently, new detection scenarios may be developed and added to an existing toolset without having to change the rest of the detection components (for instance, alert manager 66). Each new scenario may be provided with its own template for generating an alert message fragment. This decoupled architecture of the security system may substantially facilitate development, testing, and deployment, resulting in an overall reduction of the time-to-market and maintenance costs.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a server computer system configured to protect a plurality of client systems against computer security threats to:

in response to receiving a forensic indicator, select a first routine for evaluating a first security predicate from a plurality of routines, the first routine selected according to the forensic indicator, wherein the forensic indicator comprises a plurality of metadata elements characterizing a network flow between a client system of the plurality of client systems and another party, wherein the plurality of routines form a decision tree, and wherein each node of the decision tree represents a different security predicate to be evaluated;

select a second routine for evaluating a second security predicate from the plurality of routines, the second routine selected according to a result of executing the first routine;

in response to selecting the first routine, add a first text message to a security alert indicating whether the client system is subject to a computer security threat, the first text message determined according to a first message template selected according to the first routine;

in response to selecting the second routine, add a second text message to the security alert, the second text message determined according to a second message template selected according to the second routine; and transmit the security alert to an administration device configured to display the security alert to a human operator.

2. The method of claim 1, wherein evaluating the first security predicate comprises evaluating a third security predicate, and wherein the method further comprises employing at least one hardware processor of the server computer system to:

select a third routine for evaluating the third security predicate from the plurality of routines; and add a third text message to the security alert in preparation for transmission to the administration device, the third text message determined according to a third message template selected according to the third routine.

3. The method of claim 2, wherein the first text message comprises a hyperlink which, when activated, causes a display of the third text message.

4. The method of claim 1, further comprising employing at least one hardware processor of the server computer system to:

determine a verdict indicating whether the client system is subject to the computer security threat, the verdict determined according to the result of executing the first routine and to another result of executing the second routine; and add an indicator of the verdict to the security alert in preparation for transmission to the administration device.

5. The method of claim 1, wherein the first message template comprises a placeholder, and wherein determining the first text message comprises replacing the placeholder with a value of the first security predicate determined according to the result of executing the first routine.

6. The method of claim 1, wherein the first text message comprises an item selected from a group consisting of an indicator of a device type of the client system, an indicator of a geographical location of the another party, and an indicator of a time of occurrence of the electronic communication.

7. The method of claim 1, wherein the plurality of metadata elements comprises a tagged element computed according to another element of the plurality of metadata elements.

8. The method of claim 1, wherein the first text message comprises an identifier enabling the human operator to identify the first routine among the plurality of routines.

9. The method of claim 1, wherein the first text message comprises a hyperlink which, when activated, causes a display of a value of the first security predicate.

10. A server computer system configured to protect a plurality of client systems against computer security threats, the server computer system comprising at least one hardware processor configured to execute a forensic analyzer and an alert manager connected to the forensic analyzer, wherein:

the forensic analyzer is configured to:

in response to receiving a forensic indicator, select a first routine for evaluating a first security predicate from a plurality of routines, the first routine selected according to the forensic indicator, wherein the forensic indicator comprises a plurality of metadata elements characterizing a network flow between a client system of the plurality of client systems and another party, wherein the plurality of routines form a decision tree, and wherein each node of the decision tree represents a different security predicate to be evaluated, and select a second routine for evaluating a second security predicate from the plurality of routines, the second routine selected according to a result of executing the first routine; and the alert manager is configured to:

in response to the forensic analyzer selecting the first routine, add a first text message to a security alert indicating whether the client system is subject to a computer security threat, the first text message determined according to a first message template selected according to the first routine, in response to the forensic analyzer selecting the second routine, add a second text message to the security alert, the second text message determined according to a second message template selected according to the second routine, and transmit the security alert to an administration device configured to display the security alert to a human operator.

11. The server computer system of claim 10, wherein evaluating the first security predicate comprises evaluating a third security predicate, and wherein:

the forensic analyzer is further configured to select a third routine for evaluating the third security predicate from the plurality of routines; and the alert manager is further configured to add a third text message to the security alert in preparation for transmission to the administration device, the third text message determined according to a third message template selected according to the third routine.

12. The server computer system of claim 11, wherein the first text message comprises a hyperlink which, when activated, causes a display of the third text message.

13. The server computer system of claim 10, wherein:

the forensic analyzer is further configured to determine a verdict indicating whether the client system is subject to the computer security threat, the verdict determined according to the result of executing the first routine and to another result of executing the second routine; and the alert manager is further configured to add an indicator of the verdict to the security alert in preparation for transmission to the administration device.

14. The server computer system of claim 10, wherein the first message template comprises a placeholder, and wherein determining the first text message comprises replacing the placeholder with a value of the first security predicate determined according to the result of executing the first routine.

15. The server computer system of claim 10, wherein the first text message comprises an item selected from a group consisting of an indicator of a device type of the client system, an indicator of a geographical location of the another party, and an indicator of a time of occurrence of the electronic communication.

16. The server computer system of claim 10, wherein the plurality of metadata elements comprises a tagged element computed according to another element of the plurality of metadata elements.

17. The server computer system of claim 10, wherein the first text message comprises an identifier enabling the human operator to identify the first routine among the plurality of routines.

18. The server computer system of claim 10, wherein the first text message comprises a hyperlink which, when activated, causes a display of a value of the first security predicate.

19. A non-transitory computer-readable medium storing instructions which, when executed by at least one hardware processor of a server computer system configured to protect a plurality of client systems against computer security threats, causes the server computer system to execute a forensic analyzer and an alert manager connected to the forensic analyzer, wherein:

the forensic analyzer is configured to:

in response to receiving a forensic indicator, select a first routine for evaluating a first security predicate from a plurality of routines, the first routine selected according to the forensic indicator, wherein the forensic indicator comprises a plurality of metadata elements characterizing a network flow between a client system of the plurality of client systems and another party, wherein the plurality of routines form a decision tree, and wherein each node of the decision tree represents a different security predicate to be evaluated, and select a second routine for evaluating a second security predicate from the plurality of routines, the second routine selected according to a result of executing the first routine; and the alert manager is configured to:

in response to the forensic analyzer selecting the first routine, add a first text message to a security alert indicating whether the client system is subject to a computer security threat, the first text message determined according to a first message template selected according to the first routine, in response to the forensic analyzer selecting the second routine, add a second text message to the security alert, the second text message determined according to a second message template selected according to the second routine, and transmit the security alert to an administration device configured to display the security alert to a human operator.

20. The computer-readable medium of claim 19, further storing a second set of instructions, the second set of instructions causing the at least one hardware processor to execute the first routine.

* * * * *